2,752,364
PRODUCTION OF QUINIZARIN

Marvin O. Shrader, Pittsburgh, Pa., assignor to General Aniline & Film Corporation, New York, N. Y., a corporation of Delaware No Drawing. Application December 26, 1952, Serial No. 328,131

1 Claim. (Cl. 260—383)

This invention relates to a new method for producing quinizarin, which is 1,4-dihydroxyanthraquinone.

Quinizarin is an important intermediate in the manufacture of dyestuffs of the acetate, vat and wool types. One method which has been employed for manufacturing this intermediate consists in heating a mixture of p-chlorophenol, phthalic anhydride, boric acid, and sulfuric acid at about 200° C. until the formation of quinizarin ceases, drowning the mixture in water, heating to decompose the quinizarin-boric acid complex, and filtering off and washing the quinizarin.

While the mechanism of the aforementioned reaction is not definitely known, it is sufficient for the purposes of this discussion to state that during the course of the reaction hydrogen chloride gas is generated in and evolved from the reaction mixture by hydrolysis of the chlorine atom from an organic molecule. This evolution of gas results in at least two operational difficulties which are of major concern because of their detrimental effects upon the facile and efficient conduct of the reaction.

The first difficulty is the tendency of the gas to form a stable foam on the surface of the reaction mass. This foam is often uncontrollable, resulting in the reaction vessel foaming over. The second difficulty is entrainment of phthalic anhydride in the hydrogen chloride gas, with consequent loss thereof in addition to clogging of the vent lines and caking on the free-board walls of the reaction vessel due to crystallization. While the provisions of outsize vent lines, or of a device for venting through the manhole, as described by A. E. Pinkney in Chem. & Met. Eng. 45, 526 (1938), may assist in solving this problem, such expedients are not entirely satisfactory, being unwieldly and costly in requiring use of special equipment.

It is an object of this invention to provide a new process for manufacturing quinizarin which would avoid the above described difficulties. Other objects and advantages will appear as the description proceeds.

These objects are attained by the instant invention, which is based upon the discovery that the inclusion in the above described reaction mass of an amount of a high boiling solvent containing a polyhalogenated benzene nucleus sufficient to form a surface film on the said reaction mass eliminates foaming and prevents building up of the phthalic anhydride on the free-board walls of the reaction vessel and in the vent lines.

The effectiveness of the high boiling solvent containing a polyhalogenated benzene nucleus as an anti-foaming agent in the reaction involved herein is surprising, particularly when it is considered that sulfonation of the benzene nucleus would be expected to occur on heating with sulfuric acid and boric acid to the temperatures required in the reaction. Said solvent also prevents phthalic anhydride crystals from building up on the free-board walls of the reaction vessel and, when using a vessel with a reflux vent line, from clogging the vent line because it is entrained with the phthalic anhydride in the hydrogen chloride gas and continuously refluxes, dissolving and returning any condensed phthalic anhydride to the reaction phase. Thus, the use of the instant invention not only prevents formation of undesirable foam but also permits the use of conventional apparatus and obviates the use of a larger excess of phthalic anhydride since there is no loss of the reactant from the reaction mass. The yield of the process is correspondingly improved.

In general the reaction is carried out in a manner well known in the art. Thus, the temperature of the reaction may range from about 150 to 220° C., preferably 180° to 220° C., and the duration from about 3 to 15 hours. The molar ratio of phthalic anhydride to p-chlorophenol may range from about 1:1 to 3:1. The sulfuric acid is employed in large amounts, ranging from about 4 to 24 moles for each mole of p-chlorophenol. The boric acid is employed in relatively small amounts, ranging from about ½ to 1½ mols per mole of p-chlorophenol.

The solvent operative in the instant invention must in general be liquid under the conditions of reaction and must have a specific gravity lower than that of the reaction mass so that it will form a substantially stable surface film thereon, and it must be capable of dissolving phthalic anhydride. It should obviously be substantially insoluble and inert with respect to the reaction mass at the temperature of reaction, and should preferably have steam volatility to permit of easy removal. The preferred solvent containing a polyhalogenated benzene nucleus for use in accordance with this invention is trichlorobenzene. However, other similar solvents having the required properties may be employed, such as certain other polychlorinated and polybrominated benzenes, etc. The amount of solvent added to the reaction mass should be sufficient to provide a surface film thereon. While an amount reasonably in excess of this may not be detrimental, too large an excess would be undesirable in view of its solvent action on one or both of the reactants whereby an undue amount of such reactant or reactants would dissolve in the solvent and be unavailable for reaction to produce the desired quinizarin product. In any particular instance, the amount of solvent required for the purposes of this invention will obviously depend in large part on the quantity of the reaction mass and the size and shape of the reaction vessel.

The reaction is carried out in ordinary apparatus, this being one of the advantages of the instant invention. A reflux vent line on the reaction vessel permits egress of the hydrogen chloride gas formed during the reaction while returning condensed phthalic anhydride to the reaction vessel in solution in the high boiling solvent entrained in said gas and condensed together with the anhydride.

The following example of this invention is given for illustrative purposes only, and is not to be regarded as limitative. Parts are by weight unless otherwise indicated.

Example 1

A mixture composed of 75 parts of boric acid, 109 parts of p-chlorophenol, 180 parts of phthalic anhydride, 42.5 parts of trichlorobenzene and 660 parts of 20% oleum were heated in 2 hours to 200–205° C. and held at this temperature for 8 hours. Little to no phthalic anhydride condensed on the free-board walls or in the vent lines of the reaction vessel during the operation, nor did foaming of the reaction mass occur. The reaction mass was then drowned in 2200 parts of water and steam passed therethrough for a period of 4 hours. The steaming operation decomposed the quinizarin-boric acid complex and simultaneously removed the trichlorobenzene. The slurry was then diluted with cold water to a temperature of 70° C. and filtered and washed neutral with water. After dissolving out the dilute alkali soluble impurities by treatment with soda ash, a yield of 183 parts of quinizarin was obtained.

The following example is given for comparative purposes, to show the inoperativeness of petroleum hydrocarbons for producing the desired results.

*Example 2*

The process of Example 1 was repeated, except that a mixture of petroleum hydrocarbons boiling at about 215° C. (e. g., Deo-Base, L. Sonneborn & Sons, Inc., New York), was substituted for the trichlorobenzene. Foaming occurred and the weight of sublimed phthalic anhydride recovered was 62.3 parts. The yield of quinizarin was only 157.5 parts.

Various modifications and variations of this invention will be obvious to a worker skilled in the art and it is to be understood that such modifications and variations are to be included within the purview of this application and the spirit and scope of the appended claim.

I claim:

In a process for producing quinizarin by heating a mixture comprising p-chlorophenol, phthalic anhydride, boric acid, and sulfuric acid at about 150° to 220° C., the improvement consisting in including in said mixture an amount of trichlorobenzene sufficient to form a surface film on the reaction mass.

References Cited in the file of this patent

UNITED STATES PATENTS

| | | |
|---|---|---|
| 1,087,412 | Unger et al. | Feb. 17, 1914 |
| 2,445,538 | Sievenpiper | July 20, 1948 |